(12) United States Patent
Valdez

(10) Patent No.: US 12,500,669 B2
(45) Date of Patent: Dec. 16, 2025

(54) PASSIVE OPTICAL NETWORK ADAPTOR WITH WIRELESS INTERFACE

(71) Applicant: FRONTIER COMMUNICATIONS HOLDINGS, LLC, Dallas, TX (US)

(72) Inventor: John Valdez, Copper Canyon, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/204,045

(22) Filed: May 9, 2025

(65) Prior Publication Data

US 2025/0274196 A1   Aug. 28, 2025

Related U.S. Application Data

(63) Continuation of application No. 18/889,230, filed on Sep. 18, 2024, now Pat. No. 12,328,142, and a continuation of application No. 18/889,185, filed on Sep. 18, 2024, now Pat. No. 12,328,141, which is a continuation of application No. 18/443,245, filed on Feb. 15, 2024, now Pat. No. 12,136,947, said application No. 18/889,230 is a continuation of application No. 18/442,964, filed on Feb. 15, 2024, now Pat. No. 12,136,946, said application No. 18/889,185 is a continuation of application No. 18/442,964, filed on Feb. 15, 2024, now Pat. No. 12,136,946, said application No. 18/889,230 is a
(Continued)

(51) Int. Cl.
*H04B 10/11* (2013.01)
*H04B 10/25* (2013.01)
*H04Q 11/00* (2006.01)

(52) U.S. Cl.
CPC ............ *H04B 10/11* (2013.01); *H04B 10/25* (2013.01); *H04Q 11/0067* (2013.01)

(58) Field of Classification Search
CPC .... H04B 10/11; H04B 10/25; H04Q 11/0067; H04Q 2011/0083; H04Q 11/0071; H04Q 2011/0081; H04J 3/1694; H04J 14/0232; H04J 3/14; H04J 14/0246; H04J 14/0226
See application file for complete search history.

(56) References Cited

U.S. PATENT DOCUMENTS 5,737,690 A   4/1998   Gutman
5,940,199 A   8/1999   Yoshida
(Continued)

*Primary Examiner* — Hibret A Woldekidan
(74) *Attorney, Agent, or Firm* — MARSHALL, GERSTEIN & BORUN LLP

(57) ABSTRACT

The techniques described within this disclosure are directed to an in-line adaptor or coupling device of a PON that detects incoming optical signals (e.g., of different services) being delivered over the PON on different bands of wavelengths supported by an incoming optical fiber of the PON, converts (if necessary) any optical signals to suitable wavelength signals, and transmits the converted optical signals to a last mile termination unit via suitable output interfaces. At least a portion of the incoming optical signals are not converted by the in-line adaptor, and instead are passed-through the in-line adaptor to the last mile termination unit via an optical output interface. The in-line adaptor further includes one or more wireless interfaces via which information pertaining to the received optical signals and/or other information related to the in-line adaptor is transmitted to one or more recipient devices.

30 Claims, 3 Drawing Sheets

Related U.S. Application Data continuation of application No. 18/443,245, filed on Feb. 15, 2024, now Pat. No. 12,136,947, which is a continuation of application No. 18/140,385, filed on Apr. 27, 2023, now Pat. No. 11,936,424, said application No. 18/442,964 is a continuation of application No. 18/140,385, filed on Apr. 27, 2023, now Pat. No. 11,936,424.

(56) References Cited

U.S. PATENT DOCUMENTS

| | | |
|---|---|---|
| 8,655,167 B1 | 2/2014 | Lam et al. |
| 10,491,296 B1 | 11/2019 | Wellbrock et al. |
| 11,906,389 B1 | 2/2024 | Perron et al. |
| 2007/0242954 A1 | 10/2007 | Sackman |
| 2008/0008469 A1 | 1/2008 | Yokoyama |
| 2009/0067836 A1* | 3/2009 | Liu ................ H04Q 11/0067 398/45 |
| 2009/0238561 A1 | 9/2009 | Huang et al. |
| 2011/0110662 A1 | 5/2011 | Wellbrock et al. |
| 2013/0251364 A1 | 9/2013 | Pachnicke et al. |
| 2015/0125146 A1 | 5/2015 | Erreygers et al. |
| 2015/0229389 A1 | 8/2015 | Kim et al. |
| 2016/0277102 A1 | 9/2016 | Kim et al. |
| 2017/0005723 A1* | 1/2017 | Prause ................ H04B 10/07 |
| 2018/0139006 A1 | 5/2018 | Zhao et al. |
| 2018/0199119 A1* | 7/2018 | Gao ................ H04J 14/0246 |
| 2020/0300449 A1 | 9/2020 | Parfitt et al. |
| 2022/0167258 A1 | 5/2022 | Padhiar et al. |
| 2022/0216916 A1 | 7/2022 | Compann |
| 2022/0312088 A1 | 9/2022 | Nandwana et al. |
| 2024/0280758 A1 | 8/2024 | Kawano et al. |

* cited by examiner

PASSIVE OPTICAL NETWORK ADAPTOR WITH WIRELESS INTERFACE

CROSS-REFERENCE TO RELATED APPLICATIONS

The present application is a continuation of U.S. patent application Ser. No. 18/889,230 entitled "Passive Optical Network Adaptor with Wireless Interface" and filed on Sep. 18, 2024, and is also a continuation of U.S. patent application Ser. No. 18/889,185 entitled "Passive Optical Network Adaptor with Wireless Interface" and filed on Sep. 18, 2024; each of which is a continuation of U.S. patent Ser. No. 18/442,964 entitled "Passive Optical Network Adaptor with Wireless Interface," filed on Feb. 15, 2024 and now issued as U.S. Pat. No. 12,136,946, and is also a continuation of U.S. patent application Ser. No. 18/443,245 entitled "Passive Optical Network Adaptor with Wireless Interface," filed on Feb. 15, 2024 and now issued as U.S. Pat. No. 12,136, 947; each of which is a respective continuation of U.S. patent application Ser. No. 18/140,385 entitled "Passive Optical Network Adaptor with Wireless Interface" filed on Apr. 27, 2023 and now issued as U.S. Pat. No. 11,936,424, the disclosures of which are hereby incorporated by reference herein in their entireties.

Additionally, this application is related to U.S. patent application Ser. No. 18/140,224 entitled "In-Line Diagnostic Tool in Passive Optical Networks" filed on Apr. 27, 2023 and now issued as U.S. Pat. No. 1,199,737, the disclosure of which is incorporated herein in its entirety.

FIELD OF THE DISCLOSURE

This disclosure relates generally to in-line adaptors for last mile termination units in passive optical networks and, in particular, to utilizing in-line adaptors that have wireless interfaces.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter.

A PON can support multiple types of services, each of which may utilize a different optical wavelength band for delivery of its signals. That is, signals of different services which utilize different optical wavelength bands as carriers may be transmitted and received across the PON using the same PON infrastructure components (e.g., optical fibers, OLTs, FDHs, LMTUs, etc.). Examples of these different services can include RF (Radio Frequency) Video and IPTV (Internet Protocol television), to name a few.

To support the delivery of different services to end-point locations of the PON (e.g., customer premises, or other physical locations that are serviced by the PON), in-line adaptors may be utilized. An in-line adaptor may be disposed proximate to or at the location of an LMTU, and may be optically disposed in between LMTU and the incoming optical fiber that optically connects the LMTU with the PON. That is, the in-line adaptor couples (e.g., directly couples) the incoming optical fiber of the PON (e.g., the distribution optical fiber) and the LMTU and, as such, the "in-line adaptor" of the PON is interchangeably referred to herein as a "coupling device" or an "in-line coupling device" of or associated with the LMTU. Generally speaking, the in-line adaptor may receive the incoming optical fiber of the PON, monitor for and detect the incoming optical signals that are being delivered over the incoming optical fiber on different wavelength bands, and provide the incoming optical signals to the LMTU via appropriate output interfaces and channels, optical or otherwise. For example, an in-line adaptor may monitor a first wavelength band of the incoming optical fiber (e.g., 1553-1565 nm) to detect any RF Video signals being carried thereon, convert the detected RF Video signals to QAM (Quadrature Amplitude Modulation) or other suitable RF signals, and transmit the RF signals to the LMTU, e.g., via a suitable wired interface such as a wired RF output. Simultaneously, the add-on adaptor may pass-through any IPTV signals being carried on a second set of wavelength bands over the incoming optical fiber (e.g., 1260-1542 nm and 1573-1650 nm) to the LMTU, e.g., via an optical interface or optical output. In many cases, in-line adaptors may be utilized at selected service locations to enable the PON 100 to deliver, via the PON infrastructure, multiple types of services to endpoint service locations, while insulating (and in some cases, preventing) such services from being compromised due to optical drift.

SUMMARY

The systems, methods, devices, and techniques described within this disclosure are directed to an in-line adaptor of a PON that detects incoming optical signals (e.g., of different services) which are being delivered over the PON on different bands of wavelengths supported by an incoming optical fiber of the PON, converts (if necessary) any optical signals to suitable non-optical wavelength signals, and transmits the converted optical signals to a last mile termination unit via suitable output interfaces. At least a portion of the incoming optical signals are not converted by the in-line adaptor, and instead are passed-through the in-line adaptor to the last mile termination unit via an optical output interface. Accordingly, the in-line adaptor may be configured to route content and signaling of the different services supported by the PON to the last mile termination unit. In some cases, the in-line adaptor may also be configured to route outgoing signaling and/or content generated by the last mile termination unit and/or generated by the in-line adaptor itself over the PON to be delivered to corresponding recipients.

The in-line adaptor or coupling device of the present disclosure, in embodiments, may include one or more wireless interfaces via which the in-line adaptor may receive and/or transmit information related to the optical signals, to one or more services supported by the PON, to the LMTU to which the in-line adaptor is connected, and/or to the in-line adaptor itself. Indeed, the in-line adaptor may be configured to discover, determine, and/or generate the information corresponding to the one or more optical signals, the one or more services supported by the PON, the LMTU, and/or the in-line adaptor, and transmit respective wireless signals including said information to appropriate recipients, as is described in more detail herein.

In an embodiment, an in-line adaptor or coupling device utilized in a passive optical network (PON) includes a first optical interface via which an optical fiber of the PON is received at the coupling device and includes a second optical interface that optically couples the coupling device to a last mile termination unit. The received optical fiber may optically connect the coupling device, via the first optical interface, to an optical line terminal (OLT) of the PON, and the last mile termination unit and the coupling device may both be physically disposed at a location (e.g., a physical location) serviced by the PON. The coupling device also includes a pass-through component that optically connects the first optical interface to the second optical interface and via which the coupling device delivers (e.g., by passing through the coupling device) at least one optical signal between the optical fiber and the last mile termination unit. Additionally, the coupling device includes one or more wireless interfaces via which the coupling device transmits, to one or more other devices, one or more wireless signals corresponding to the at least one optical signal.

In an embodiment, a method at an in-line adaptor or coupling device of a passive optical network (PON) includes obtaining, by the coupling device and via a first optical interface of the coupling device, at least one optical signal that has been delivered over an optical fiber of the PON. The optical fiber may be received at the coupling device at the first optical interface, and the optical fiber may optically connect the coupling device to an optical network terminal (ONT) of the PON. The method also includes providing, by the coupling device and via a second optical interface of the coupling device, the at least one optical signal to a last mile termination unit. The second optical interface may optically couple the coupling device to the last mile termination unit, and the last mile termination unit and the coupling device may both be disposed at a location serviced by the PON. Additionally, the method includes generating, by the coupling device, a wireless signal corresponding to the at least one optical signal, and transmitting, by the coupling device, the wireless signal to a second device via a wireless interface of the coupling device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
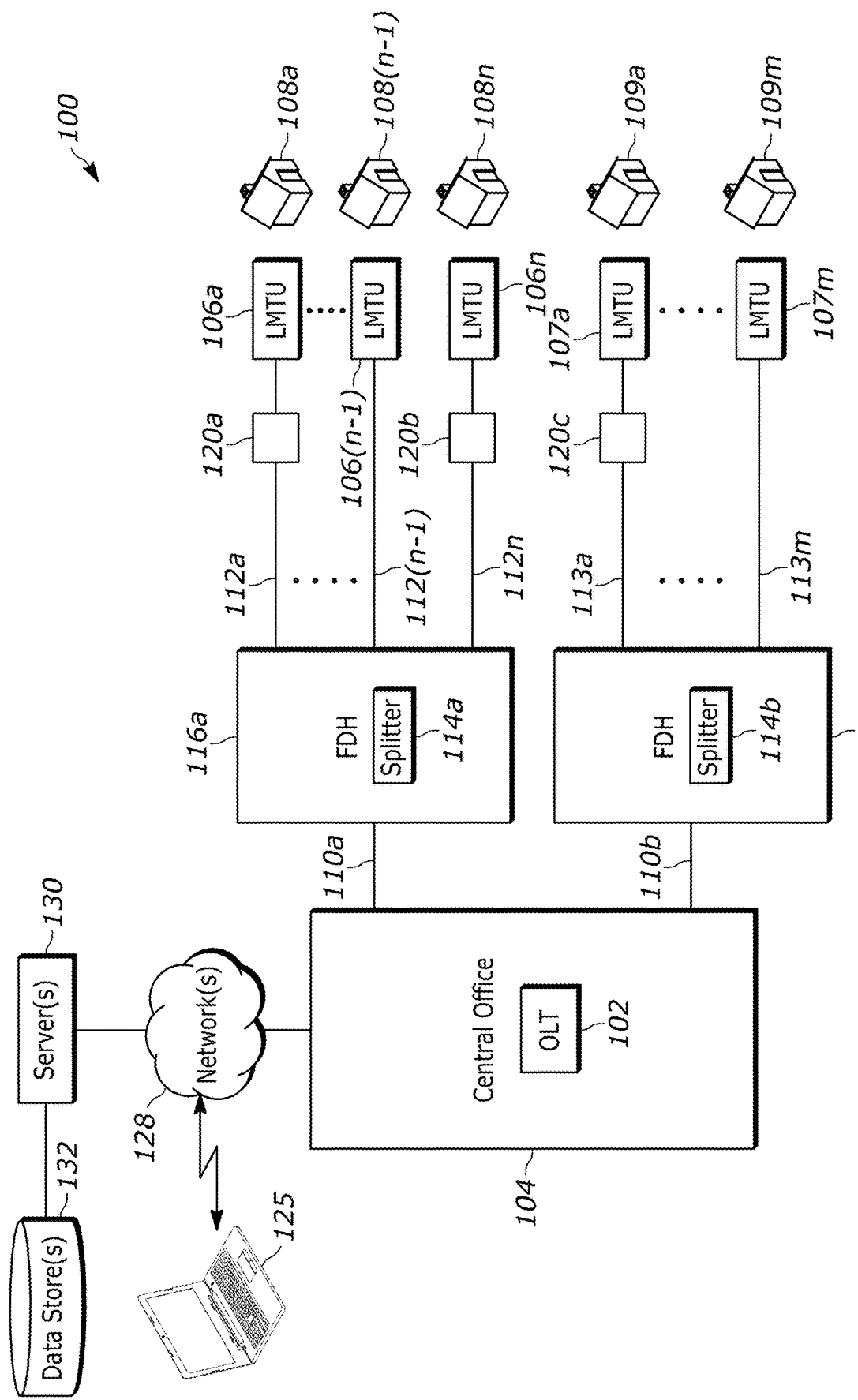
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units (LMTUs) 106a, . . . , 106n at respective customer premises 108a, . . . , 108n. The last mile termination units 106a, . . . , 106n may be located outside and/or inside the customer premises or locations 108a, . . . , 108n. Each last mile termination unit 106a, . . . , 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels or is delivered. In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110*b* from the OLT 102 that is optically coupled to another plurality of last mile termination units 107*a*-107*m* at respective customer premises 109*a*-109*m* via another many-to-one optical splitter 114*b* included in another fiber distribution hub 116*b* and via respective secondary optical fibers 113*a*-113*m*.

Notably, the PON 100 depicted in FIG. 1 includes in-line adaptors 120*a*-120*c* respectively located at or proximate to endpoint service locations 108*a*, 108*n*, and 109*a*. As shown in FIG. 1, each in-line adaptor 120*a*-120*c* is optically connected to the PON 100 via a respective optical fiber 112*a*, 112*n*, and 113*a* and is optically connected (and in some cases, also is communicatively connected via wired and/or wireless links, not explicitly illustrated in FIG. 1) to respective LMTUs 106*a*, 106*n*, and 107*a*. Generally, the connections between the in-line adaptors 120*a*-120*c* and respective LMTUs 106*a*, 106*n*, and 107*a* are direct connections. Accordingly, an "in-line adaptor" is interchangeably referred to herein as a "coupling device" of the PON 100, as the in-line adaptor/coupling device couples a respective LMTU to the PON. The in-line adaptors 120*a*-120*c* may enable multiple types of services to be delivered via the infrastructure of the PON 100 to the endpoint service locations 108*a*, 108*n*, and 109*a*, e.g., without requiring the physical LMTUs 106*a*, 106*n*, 107*a* to be retrofitted to support the multiple types of services, and to provide the technical benefit of insulating (and in some cases preventing) various services from being compromised due to optical drift. For example, the in-line adaptors 120*a*-120*c* may enable both IPTV and RF Video to be delivered to the endpoint service locations 108*a*, 108*n*, and 109*a* while insulating RF Video services from adversely being affected by optical drift. Further, each of the in-line adaptors 120*a*-120*c* may include one or more respective wireless interfaces, which may be leveraged to support a multitude of other beneficial functionalities within the PON 100. A more detailed description of the in-line adaptors 120*a*-120*c* is provided elsewhere within this disclosure.

As utilized herein, the "components" of the PON 100 generally refer to the devices, nodes, and optical fibers of the PON 100. For example, the components of the PON 100 shown in FIG. 1 may include the OLT 102, the FDHs 116*a*, 116*b*, the splitters 114*a*, 114*b*, the LMTs 106*a*-106*n* and 107*a*-107*m*, the in-line adaptors 120*a*-120*c*, and the optical fibers interconnecting the devices or nodes, e.g., the optical fibers 110*a*-110*b*, 112*a*-112*n*, and 113*a*-113*m*.

In some scenarios, an optical terminal (e.g., the OLT 102 and/or one or more the last mile termination units 106*a*-106*n*, 107*a*-107*m*) may transmit optical test signals and/or patterns, indication light, and/or other types of measurement signals into an optical fiber in response to control signals received from a computing device. For example, the OLT 102 and/or the one or more LMTUs 106*a*-106*n*, 107*a*-107*m* may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

Example In-Line Adaptor

Figure 2:
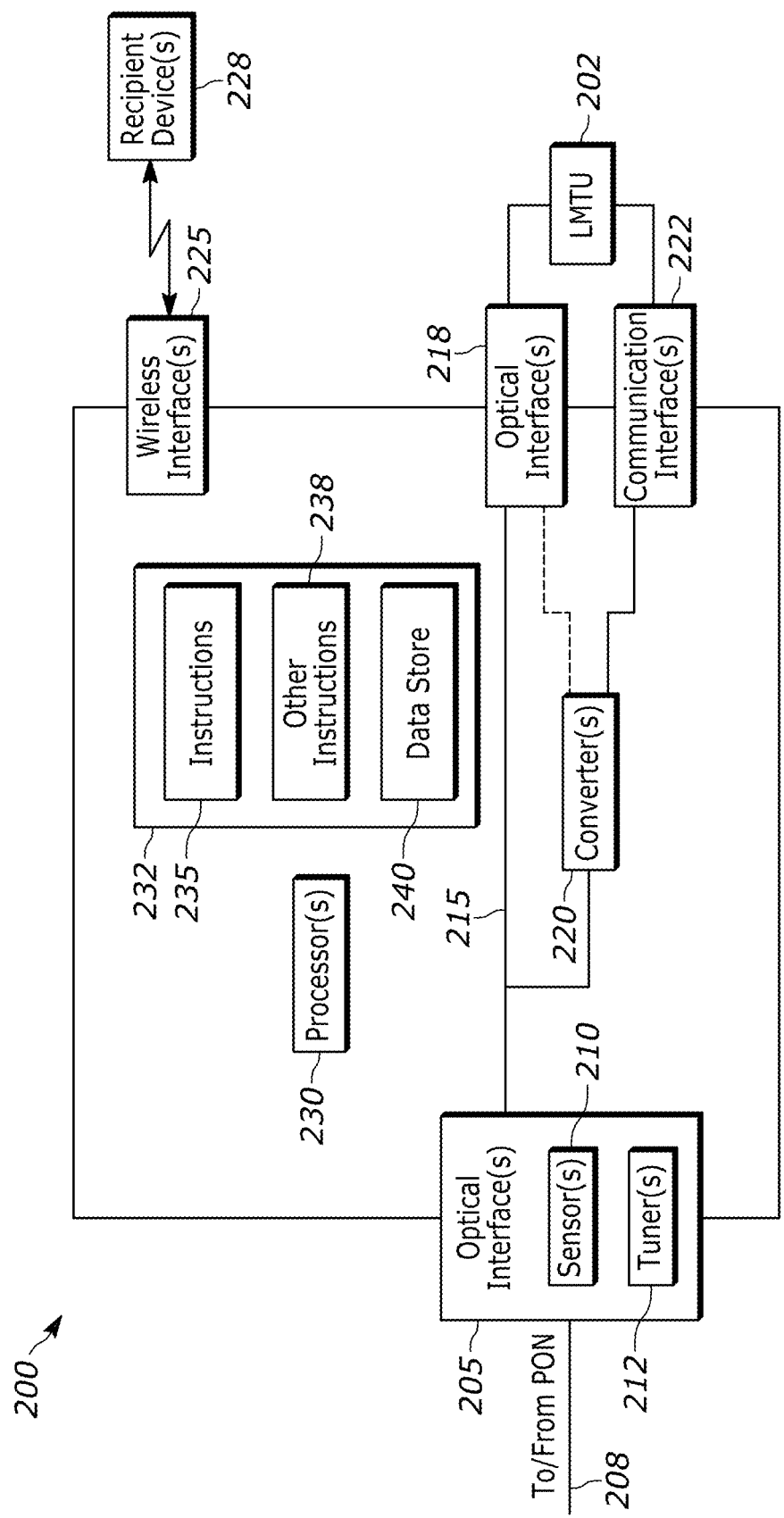
FIG. 2 is a block diagram of an example in-line adaptor or coupling device that is in accordance with the techniques discussed herein and that may be included in the PON of FIG. 1.

FIG. 2 is a block diagram representative of an example in-line adaptor 200 (which is referred to interchangeably herein as a coupling device 200) which may be utilized in a passive optical network. For example, the in-line adaptor 200 may be the in-line adaptor 120*a*, 120*b*, and/or 120*c* of the example PON 100 depicted in FIG. 1, or the in-line adaptor 200 may be another in-line adaptor utilized in the PON 100 or utilized in another PON. For ease of illustration, and not for limitation purposes, the in-line adaptor 200 is described with simultaneous reference to the PON 100.

As depicted in FIG. 2, the example in-line adaptor 200 can be physically disposed in between the PON 100 and a last mile termination unit (LMTU) 202 and may optically connect the LMTU 202 with the PON 100. As such, the in-line adaptor 200 physically couples the LMTU 202 and the PON 100.

The in-line adaptor or coupling device 200 may include an optical interface 205 (e.g., a "network-facing" optical interface 205) that receives an optical fiber 208 of the PON 100 (e.g., an "incoming" or "distribution" optical fiber 208). The incoming optical fiber 208 may optically connect the adaptor 200 (and, thus, the LMTU 202) to the PON 100, e.g., directly with the OLT 102, to the OLT 102 via a fiber distribution hub 116*a*, 116*b* that is optically connected to the OLT 102, etc. Generally speaking, the adaptor 200 may receive, via the incoming optical fiber 208, optical signals that are transmitted from the PON 100 for delivery to the LMTU 202, where said optical signals may include content of various services that are delivered via the PON 100 for reception by the LMTU 202. The received service content may include payload of services, signaling for the services, metadata for the payload and signals of the service, etc. For example, the optical signals received at the adaptor 200 via the optical fiber 208 and the network-facing optical interface 205 may include payload data and signaling/metadata for IP TV services, RF video services, and/or other services that are delivered over the PON 100. Generally, different services may be delivered over the PON 100 by utilizing respective bands of optical wavelengths supported by the PON 100. In an example implementation, a first service may utilize optical wavelength bands 1260-1543 nm and 1573-1650 nm for delivery of its respective payload and signaling content, and a second service may utilize optical wavelength bands 1553-1565 nm for delivery of its respective payload and signaling content. Of course, other services may utilize other respective optical wavelength bands.

In some implementations, in addition to payload and signaling/metadata of provided services, optical signals that are transmitted from the PON 100 for delivery to the LMTU 202 via the incoming optical fiber 208 and the in-line adaptor 200 may include signaling and/or information pertaining to the PON 100 itself and/or to components of the PON 100 (e.g., signaling and information other than the signaling and information of the delivered services). For example, the server(s) 130, the portable computing device 125, and/or the OLT 102 may send optical control signals, optical test signals, etc. to the LMTU 202 via the optical fiber 208 and the in-line adaptor 200. Said non-service-specific signals may be delivered over the same or different wavelength bands as those utilized to provide services to the LMTU 202. Indeed, the PON 100 (including the incoming optical fiber 208) may support a plurality of optical wavelength bands including, for example: 100-400 nm, 630-670 nm, 1260-1280 nm, 1284-1288 nm, 1290-1310 nm, 1340-1344 nm, 1356-1360 nm, 1530-1565 nm, 1575-1581 nm, 1596-1603 nm, and/or 1613-1650 nm, to name a few, at least some of which may be utilized to provide signaling and/or information/content of services to endpoint locations, and at least some of which may be utilized to provide non-service signaling and/or information/content to endpoint locations.

As shown in FIG. 2, the network-facing optical interface 205 of the in-line adaptor 200 may include one or more sensors 210, each of which detects or senses the presence of (and, optionally, one or more conditions relating to) optical signals which are being delivered to the LMTU 202 via different optical wavelength bands over the incoming optical fiber 208. The one or more sensors 210 may include multiple, separate sensors. Different sensors may detect the presence and/or conditions of optical signals on different bands of wavelengths, and/or the one or more sensors 210 may include an integral sensor which is configured to detect the presence and/or conditions of optical signals on multiple, different wavelength bands. As such, in some embodiments, the network-facing optical interface 205 may include one or more tuners 212 (e.g., which may include one or more auto-tuners) that automatically tune the optical interface 205 to various wavelength bands on which incoming optical signals are detected. In some implementations, the tuner 212 may also adjust (e.g., may automatically adjust) an incoming optical signal based on any optical drift of the incoming optical signal. Data generated by the sensor(s) 210 may include one or more measurements of the optical signal, and/or may be indicative of one or more sensed or measured conditions of the optical signal or otherwise related to the optical signal.

Generally speaking, optical signals that are received at the optical interface 205 of the in-line adaptor 200 via certain or selected wavelength bands of the PON 100 may be passed through 215 the adaptor 200, e.g., from the network-facing optical interface 205 through 215 the adaptor 200 to a local-facing optical interface 218 to the LMTU 202. As utilized herein, a "passed-through" optical signal is an optical signal that is delivered from the network-facing optical interface 205 to the local-facing optical interface 208 without being processed, or with minimal processing. Such signals may include optical signals that the PON 100 utilizes to provide optical-based services to the LMTU 202. For example, the PON 100 may provide content (e.g., payload and signaling/metadata) of IPTV services to the LMTU 202 by utilizing optical light in the 1260-1543 nm and 1573-1650 nm wavelength bands and, as such, optical light of these wavelength bands may be passed through 215 to the LMTU 202 (e.g., via the local-facing optical interface 218 to which the LMTU 202 is directly connected). In some embodiments, the network-facing optical interface 205 may pass through 215 any PON-related optical signals that do not include content of the provided services (e.g., that are not payload and signaling/metadata of the provided services). For example, the PON 100 may provide control signals, test signals, etc. that are generated by the server(s) 130, the agent computing device 125, the OLT 102, etc. to the LMTU 202 and that are related to the testing, performance, and administration of various PON components by utilizing optical light in the 1260-1543 nm and 1573-1650 nm wavelength bands and, accordingly, such PON-related signals may also be passed through to the LMTU 202. Accordingly, the optical wavelength bands over which the adaptor 200 receives and passes through 215 optical signals to the LMTU 202 are generally and interchangeably referred to herein as "PON operating wavelength bands," "operating wavelength bands of the PON," or "operating wavelength bands."

In some situations, the sensor 210 may detect an incoming optical signal of a service that is being carried on an optical wavelength band other than the operating wavelength bands of the PON 100. In these situations, the in-line adaptor 200 may tune 212 to the other optical wavelength band and convert the detected optical signal (e.g., by using a converter 220) into a waveform or other suitable transmission signal of an electromagnetic frequency band for delivery to the LMTU 202. For example, the sensor 210 may detect that an RF Video signal is being delivered over the incoming optical fiber 208 via an optical carrier of a 1553-1565 nm wavelength band. In this example, the in-line adaptor 200 may tune (e.g., auto-tune 212) to the 1553-1565 nm wavelength band and may utilize the converter 220 to convert the optical signal into a QAM (Quadrature Amplitude Modulation) signal. The adaptor 200 may then deliver the converted signal to the LMTU 202 via a corresponding local-facing communication interface 222 to which the LMTU 202 is directly connected.

The wavelength bands over which optical signals are to be passed through 215 the in-line adaptor 200 to the LMTU 202 and/or the wavelength bands over which optical signals are to be converted 220 prior to being delivered to the LMTU 202 may be pre-determined or pre-configured. In some embodiments, the in-line adaptor 200 may discover the identities of the wavelength bands over which optical signals are to be passed through 215 and/or the identities of the wavelength bands over which optical signals are to be converted 220, for example, based on an identity of the LMTU 202 (e.g., such as a stock-keeping unit (SKU) of the LMTU 202, a global identifier of the LMTU 202, or other suitable identifier of the LMTU 202). The adaptor 200 may obtain the identity of the LMTU 200 from the LMTU 202 upon communicatively connecting with the LMTU 200, or the adaptor 200 may obtain the identity of the LMTU 200 from the PON 100, for example. Additionally or alternatively, the in-line adaptor 200 may discover or learn the identities of the wavelength bands over which optical signals are to be passed through 215 and/or the identities of the wavelength bands over which optical signals are to be converted 220 based on an instruction received from the PON 100 via the incoming fiber 208, and/or based on an instruction received via another interface of the adaptor 200, such as the interfaces 218, 222, and/or 225. The identities of the wavelength bands over which optical signals are to be passed through 215 and/or the identities of the wavelength bands over which optical signals are to be converted 220 may be modified and/or updated, when desired.

Although FIG. 2 depicts the adaptor 200 as having a single converter 220 and a single local-facing communication interface 222, this is only for the purposes of ease of illustration and discussion. In embodiments, the adaptor 200 may include a plurality of converters 220 and a plurality of communication interfaces 222 via which converted optical signals may be delivered to the LMTU 202. For instance, different ones of the plurality of converters 220 and the plurality of communication interfaces 222 may support different frequencies and/or wavelengths of electromagnetic waves, different encoding and/or modulation techniques, etc. Typically, but not necessarily exclusively, such communication interfaces local-facing 222 may include one or more wired communication interfaces. In some embodiments, though, the adaptor 200 may convert an incoming optical signal received via one optical wavelength band to another optical wavelength band for delivery to the LMTU 202, e.g., via the optical interface 218.

Further, as depicted in FIG. 2, the in-line adaptor 200 may include one or more wireless interfaces 225 which the in-line adaptor 200 can utilize to wirelessly transmit messages and/or signals to one or more devices 228 other than the LMTU 202, and/or to wirelessly receive messages and/or signals from the one or more other devices 228. The one or more other devices 228 may include, for example, wireless devices such as a portable computing device 125 (e.g., that is being utilized by an agent of the PON), another in-line adaptor of the PON 100 coupling another LMTU to the PON 100, another component of the PON 100, a router or node included in a wireless network of which the adaptor 200 is also a node, etc. The one or more wireless interfaces 225 may include respective wireless transceivers and radios which operate at various radio frequency (RF) wireless communication frequency bands such as, for example, 900 MHZ, 2.5 GHZ, and 5.2 GHz, and/or other RF communication frequency bands such as those used for Wi-Fi, near-field communications (NFC), Bluetooth, infrared, etc., to name a few.

Generally, messages and/or signals transmitted by the in-line adaptor via the wireless interface(s) 225 may include information that the in-line adaptor 200 has sensed, detected, or otherwise determined with respect to the PON 100, to the optical signals received at the adaptor 200 via the PON 100, and/or to the sub-components of the adaptor 200. Accordingly, and as shown in FIG. 2, the in-line adaptor 200 may include one or more processors 230 and one or more tangible, non-transitory memories 232 storing a set of computer-executable instructions 235 that are executable by the one or more processors 230 to cause the adaptor 200 to sense, detect, and otherwise determine such information, generate a signal indicative of such information, and cause the signal to be transmitted from the adaptor 200 via the wireless interface 225 to one or more wireless devices 228. For example, the set of computer-executable instructions 235 may be executable by the one or more processors 230 to cause the adaptor 200 to sense, detect, and otherwise determine statuses, aspects, and/or characteristics of the optical light being received at the adaptor 200 via the network-facing optical interface 205, of optical light and other signals being provided by the adaptor 200 to the LMTU 202 (e.g., via the local-facing interfaces 218, 222), and/or of sub-components of the in-line adaptor 200, and to cause one or more signals indicative of these status, aspects, and/or characteristics to be transmitted from the adaptor 200 via the wireless interface 225 to one or more wireless devices 228. Generally speaking, the machine-readable instructions 235 stored in the memories 232, when executed by the processors 230, may cause the in-line adaptor 200 to perform at least some of the operations represented by embodiments of the methods described in this disclosure. Of course, the processors 230 may execute other machine-readable instructions 238 stored on the memories 232, and the example processors 230 may also interact with the memories 232 to store data 240 such as data formed or used during execution of the machine-readable instructions 235 and/or the other machine-readable instructions 238 stored on the memories 232.

The one or more processors 230 may be implemented using hardware, and may include a semiconductor based (e.g., silicon-based) or other suitable type of device. The one or more processors 230 may include, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the one or more processors 230 may be a field programmable gate array (FPGA), an application specific integrated circuit (ASIC), etc. that implements operations of the example methods described herein without executing instructions The one or more memories 232 are accessible by the one or more processors 230 (e.g., via a memory controller). Example memories 232 include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions 235, 238 corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the in-line adaptor 200 to provide access to the machine-readable instructions stored thereon.

In some embodiments, the computer-executable instructions 235 executing at the adaptor 200 may obtain information from the LMTU 202, and cause the information obtained from the LMTU 202 to be transmitted from the adaptor 200 via the wireless interface 225 and/or via the network-facing optical interface 205. For example, upon communicatively connecting with the LMTU 202, the LMTU 202 may transmit its identification to the adaptor 200, e.g., via one of the local-facing interfaces 218, 222, 225. The (self-) identification of the LMTU 202 may be, for example, an identifier that uniquely identifies the LMTU 202 within the PON 100 and/or an identifier of the LMTU 202 that is globally unique (e.g., across multiple PONs). For instance, the unique identifier of the LMTU 202 may be based on a serial number of the LMTU 202, a MAC address of the LMTU 202, an identifier or other suitable indication of the PON 100 with respect to the Full Service Access Network (FSAN) or other association of operator companies of PONs, and/or GPS (Global Positioning System) or other geospatial coordinates of the LMTU 202. Further, the (self-) identification of the LMTU 202 may be of any suitable format, for example, an NFC or other type of RFID tag or encoded format. For example, the adaptor 200 may obtain the identification of the LMTU 202 via passive means (e.g., by reading an NFC tag, by obtaining information that is published or broadcast by the LMTU 202, etc.) or via active means (e.g., by directly querying the LMTU 202).

The adaptor 200 may transmit the identification of the LMTU 202 to the OLT 102 and/or to the servers 130 of the PON 100 via the network-facing optical interface 205 and the optical fiber 208, and/or the adaptor 200 may transmit the identification of the LMTU 202 to one or more wireless devices 228 via the wireless interface 225. For example, the adaptor 200 may transmit the identification of the LMTU 202 to a portable computing device 125 operated by an agent of the PON 100 (e.g., via a direct wireless link), to another wireless device of the PON 100 (e.g., via a direct wireless link or a wireless network), etc. Of course, the adaptor 200 may obtain other types of information from the LMTU 202 (e.g., statuses or states, etc.) and transmit the obtained information via the wireless interface 225 to one or more wireless devices 228.

Generally speaking, in some embodiments, the instructions 235 may be executable to cause the adaptor 200 to select one or more of the output interfaces (e.g., the network-facing optical interface 205 and the one or more wireless interfaces 225) and cause information that is sensed, detected, determined, generated, and/or obtained by the adaptor 200 to be delivered to one or more recipients (e.g., wireless devices 228, the OLT 102, the servers 130, the agent computing device 125, etc.) via the selected output interfaces 205, 225. In some situations, the instructions 235 may be executable to cause the adaptor 200 to select a particular wavelength band over which to transmit the outgoing information via the network-facing optical interface 205. For example, the adaptor 200 may select one of the optical wavelength bands supported by the PON 100 (e.g., 100-400 nm, 630-670 nm, 1260-1280 nm, 1284-1288 nm, 1290-1310 nm, 1340-1344 nm, 1356-1360 nm, 1530-1565 nm, 1575-1581 nm, 1596-1603 nm, and/or 1613-1650 nm) to utilize in transmitting the outgoing information via the network-facing optical interface 205 and the optical fiber 208. In some situations, the instructions 235 may be executable to cause the adaptor 200 to select one of the wireless frequency bands supported by the adaptor 200 (e.g., 900 MHZ, 2.5 GHZ, 5.2 GHz, and/or other RF frequency bands such as those used for NFC, Bluetooth, Wi-Fi, infrared, etc.) to utilize in transmitting the outgoing information via the appropriate wireless interface 225. The selection of the output interface 205, 225 (and optionally of the wavelength and/or frequency band) may be based on, for example, a type of content or payload of the information obtained from the LMTU 202, the actual content or payload of the information obtained from the LMTU 202, a type of information sensed or determined by the adaptor 200, the content or payload of the information sensed or determined by the adaptor 200, a current status of optical and/or wireless networks and/or links, an identity of a recipient of the information, and/or other criteria.

With particular regard to the wireless devices 228 with which the in-line adaptor 200 communicates via the wireless interface(s) 225, and to bolster the security of the PON 100, the in-line adaptor 200 and a wireless device 228 may be paired together prior to communicating therebetween via the wireless interface 225. Further, the wireless device 228 may be authenticated and/or authorized to wirelessly communicate with the in-line adaptor 200, and/or to wirelessly communicate via a wireless network of which both the in-line adaptor 200 and the wireless device 228 are wireless nodes. As such, the computer-executable instructions 235 executing at the in-line adaptor 200 may include instructions that are executable to pair, authenticate, and/or authorize the wireless device 228 with the in-line adaptor 200 and/or with a wireless network of which the wireless device 228 and the in-line adaptor 200 are wireless nodes. Still further, in some situations, the computer-executable instructions 235 executing at the in-line adaptor 200 may additionally or alternatively include instructions that are executable to authenticate and/or authorize one or more applications or routines executing at the wireless device 228 with the in-line adaptor 200. For example, a graphical user interface (GUI) and/or an augmented reality (AR) application executing at the wireless device 228 may be authenticated and/or authorized to communicate with the in-line adaptor 200 via a wireless link supported by the wireless interface 225. It is noted that a wireless device 228 may be proximally located to the in-line adaptor 200 (e.g., at the location of the LMTU serviced by the in-line adaptor 200), or a wireless device 228 may be remotely located to the in-line adaptor 200 and may communicatively connect to the in-line adaptor 200 via one or more networks 128. Accordingly, the pairing, authenticating, and/or authorizing of the wireless device 228 and/or of applications executing on the wireless device 228 may be performed for the wireless device 228 and/or for the application(s) executing on the wireless device 228 as needed. For example, while a remotely-located wireless device 228 itself may not need to be paired with and authenticated/authorized with the in-line adaptor 200, an application executing on the remotely-located wireless device 228 may be authenticated and/or authorized to communicate with the in-line adaptor 200.

Example Method at a Coupling Device

Figure 3:
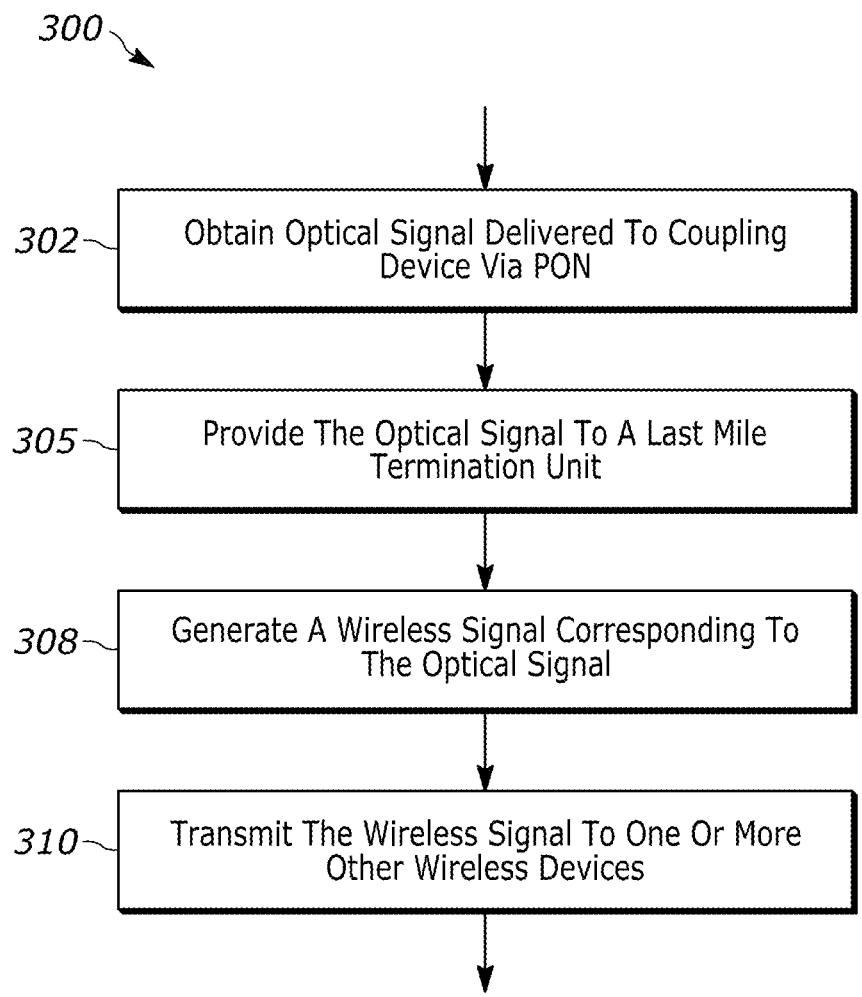
FIG. 3 depicts a flow diagram of an example method at an in-line adaptor or coupling device utilized in a passive optical network.

FIG. 3 depicts a flow diagram of an example method 300 at a coupling device or in-line adaptor utilized in a passive optical network. For example, instances of the method 300 may be executed at one or more of the in-line adaptors 120a, 120b, 120c of the PON 100 of FIG. 1, and/or the method 300 may be executed at the in-line adaptor 200 of FIG. 2. In an example implementation, the set of instructions 235 stored on the one or more memories 232 of the in-line adaptor 200 may be executable by the one or more processors 230 of the in-line adaptor 200 to cause the in-line adaptor to perform at least a portion of embodiments of the method 300. For ease of illustration, and not for limitation purposes, the method 300 is described with simultaneous reference to the PON 100 of FIG. 1 and the example in-line adaptor 200 depicted in FIG. 2.

At a block 302, the method 300 includes obtaining, by the coupling device, an optical signal (e.g., obtaining at least one optical signal) that has been delivered to the coupling device over an optical fiber of the PON. For example, the coupling device 200 may obtain the optical signal via a first optical interface 205 of the coupling device into which an optical fiber 208 of the PON is received. The optical interface 205 and the optical fiber 208 may optically connect the coupling device to an OLT 102, to one or more servers 130, and/or to one or more other components of the PON 100, for example.

At a block 305, the method 300 includes providing, by the coupling device, the obtained optical signal to a last mile termination unit (LMTU) of the PON. Typically, the coupling device and the LMTU are proximally or co-located at a location serviced by the PON (e.g., a physical location serviced by the PON), and may be directly connected via one or more interfaces. For example, the coupling device 200 may pass the obtained optical signal through the coupling device (e.g., as denoted by the reference 215), and may provide the optical signal to the LMTU 202 via a second optical interface 218 optically connecting the coupling device 200 and the LMTU 202, for example.

The optical signal that is obtained 302 by the coupling device via the first optical interface may include one or more optical signals of a first set of optical wavelengths. In some situations, though, the obtained optical signal may include respective one or more optical signals of at least one other set of optical wavelengths. For example, as previously discussed, different services that are provided to locations serviced by the PON may utilize different sets of optical wavelengths via which respective optical signals of the different services are delivered over the PON to the coupling device (and consequently, to the LMTU associated with the coupling device).

In situations in which multiple optical signals are obtained 302 by the coupling device via multiple, different optical wavelength bands (e.g., via the first optical interface 205), the method 300 may include passing a first set of optical signals of a first set of optical wavelengths through the coupling device (e.g., as denoted by the reference 215) and providing 305 the passed-through first set of optical signals to the LMTU 202 via the second optical interface 218. Additionally, in these situations, the method 300 may further include detecting, by the coupling device, the presence of a second set of optical signals that are received by the coupling device via the optical fiber, the first optical interface, and a second set of optical wavelengths. In an example, the first set of optical signals may be received by the coupling device over at least one of wavelengths between 1260-1543 nanometers or wavelengths between 1573-1650 nanometers, the second set of optical signals may be received by the coupling device over wavelengths between 1553-1565 nanometers. Accordingly, in situations in which multiple optical signals are obtained by the coupling device via the first optical interface 205 via multiple, different wavelength bands, the method 300 may include automatically tuning, by the coupling device, to the second set of wavelengths upon detection of the presence of the second set of optical signals being delivered via the second set of wavelengths. For example, the sensor 210 of the network-facing optical interface 205 may detect the presence of the second set of optical signals on the second set of wavelengths, and the tuner 212 may automatically tune the optical interface 205 to the second set of wavelengths. Upon detecting the presence of the second set of signals, in an embodiment the coupling device may convert (e.g., by utilizing the converter 220) the second set of optical signals to be of a non-optical RF wavelength, and may provide the converted, second set of optical signals to the last mile termination unit via the communication interface 222. Alternatively, in another embodiment, the coupling device may convert (e.g., by utilizing the converter 220) the second set of optical signals to be of the first set of wavelengths, and may provide the converted, second set of optical signals to the last mile termination unit via the second optical interface 218. At any rate, the LMTU 202 may receive, from the coupling device, both the first and second sets of optical signals, e.g., via the optical interface 218 and/or via the communication interface 222.

At a block 308, the method 300 includes generating, by the coupling device, a wireless signal corresponding to the optical signal, and at a block 310, the method 300 includes transmitting, by the coupling device, the generated wireless signal to one or more devices (e.g., one or more recipient devices) via a wireless interface of the coupling device. For example, the coupling device 200 may generate a wireless signal and transmit the wireless signal from the coupling device 200 via the wireless interface 225 to one or more recipient devices 228. Typically, but not necessarily, the generated and transmitted wireless signal may include payload that is indicative of information about or related to one or more optical signals that have been received at the coupling device 202, e.g., via the network-facing optical interface 205. For example, the wireless signal may include one or more measurements and/or indications of one or more conditions and/or characteristics of or pertaining to the optical signal (e.g., as detected by the sensor 210 of the coupling device). Accordingly, in this example, the method 300 may further include generating the measurements and/or the indications of the conditions and/or characteristics of or pertaining to the optical signal received at the coupling device 200, and including the generated measurements and/or indications as the payload of the wireless signal (not shown in FIG. 3). Examples of conditions of the received optical signal (e.g., which may be sensed or measured by the sensor 210) may include frequency, amplitude, attenuation, signal strength, fidelity of the payload contents of the optical signal, and the like. Other examples of conditions which may be detected and/or measured may include conditions and/or characteristics of the optical signal which are measured or detected over time, such as optical drift, changes in the fidelity of payload contents, changes in attenuation, changes in signal strength, etc. Of course, other conditions and/or characteristics may be detected, sensed, and/or measured, if desired.

In some example implementations, the wireless signal may additionally or alternatively include an output of one or more analyses or analytics which the coupling device 200 performed on one or more measurements and/or characteristics of one or more received optical signals. As such, in an embodiment (not shown in FIG. 3), the method 300 may include performing, by the coupling device, one or more analytics routines based on measurements and/or other sensed conditions related to the optical signal (e.g., as sensed by the sensor 210), and including an indication of the output of the one or more analytics routines as the payload of the wireless signal. For example, the computer-executable instructions 235 may include instructions for one or more analytics routine which measure and/or analyze one or more types of information sensed by the sensor 210 (e.g., in real-time and/or over time), determine or calculate one or more characteristics of the optical signal and/or of various conditions of the optical signal based on the measurements and/or the analysis (e.g., in real-time and/or over time), and cause a wireless signal that includes an indication of the one or more characteristics to be generated. Examples of different types of analytics routines which may be performed by the coupling device may include averages, means, maximums, minimums, rates of change, etc. (e.g., in real-time and/or over time) of various characteristics of and/or conditions related to the optical signal.

Thus, in view of the above discussion, the method 300 may include transmitting 310, via the wireless interface 225 to one or more other devices 228 (e.g., one or more recipient devices), one or more wireless signals including indications of real-time characteristics of a received optical signal, indications of characteristics of the received optical signal over time, and/or indications of analytics results pertaining to an optical signal received by the coupling device 200 via the optical fiber 208 and the optical interface 205. Further, in embodiments in which the coupling device 200 receives different optical signals via different optical wavelength bands (e.g., via the optical fiber 208 and the optical interface 205), the method 300 may include transmitting an indication of a respective optical wavelength band over which the subject optical signal was received at the coupling device 200.

The one or more recipient devices 228 of the wireless signal(s) transmitted 310 by the coupling device 200 may include another wireless device and/or may include an application executing on the other wireless device. For example, the recipient wireless device may be a portable electronic device 228 operated by an agent of the PON at the location where the coupling device 200 and LMTU 202 are disposed. A graphical user interface (GUI), augmented reality (AR), or other type of user interface application executing at the portable electronic device 228 may continually receive real-time measurements and/or analyses outputs from the in-line adaptor 200 via the wireless interface 225, and may present a continually-dated representation (e.g., a graphical or AR representation) of the real-time measurements and/or analyses outputs on a user interface of the portable electronic device 228.

In some situations, the one or more recipient devices 228 of the wireless signal(s) transmitted 310 by the coupling device 200 may include another component of the PON that includes a wireless interface (e.g., another coupling device or some other PON component), a node of a wireless network, a router, and/or another suitable wireless device. In these situations, a particular recipient device of a wireless signal generated 308 by the coupling device 200 may or may not be the intended end-recipient of the contents of the wireless signal. For example, a router or intermediate node of a wireless network supporting the PON may be the direct recipient of the wireless signal generated 308 and transmitted 310 by the coupling device 200, but may not be the intended end-recipient of the contents of the wireless signal and instead may forward or otherwise provide the contents to the intended end recipient. For example, an intermediate node of a wireless network may route the contents of a wireless signal received from the coupling device 200 over the wireless network to an intended end-recipient.

For coupling devices 200 that include multiple wireless interfaces 255, the method 300 may include selecting, from among the multiple wireless interfaces included in the coupling device, one or more specific wireless interfaces via which the generated wireless signal is transmitted 310 from the coupling device. For example, the coupling device 200 may include two or more wireless interfaces that respectively support NFC, Bluetooth, W-Fi, infrared, 900 MHz, 2.4 GHz, or 5.2 GHz wireless transmissions, to name a few, and the coupling device may select a wireless interface from among the two or more wireless interfaces of the coupling device to utilize in transmitting 310 the wireless signal. The selecting may be based on, for example, a type of the payload of the wireless signal, a content of the payload of the wireless signal, current statuses and/or usages of the various wireless link supported by the in-line adaptor 200, an identity of the recipient device and/or recipient application (e.g., the recipient(s) of the wireless signal and/or its contents), and/or other criteria. In some situations, the coupling device may wirelessly transmit 310 the same payload or content from the coupling device via multiple wireless interfaces 225 to multiple different recipient devices. For example, the coupling device may transmit an indication of real-time characteristics of the received optical signal via a Wi-Fi or Bluetooth wireless interface to a proximately-located portable computing device 125 (e.g., for viewing by an agent of the PON), and the coupling device may also transmit the indication of the real-time characteristics of the received optical signal via a 900 MHz wireless interface for delivery to the remote servers 130, e.g., for further analysis and/or long-term historization in the data store 132 of the PON 100.

In some embodiments, prior to the transmitting 310 of the wireless signal from the in-line adaptor to the one or more recipient devices (and, in some cases, prior to transmitting any payload-bearing wireless signal from the in-line adaptor to any of the one or more recipient devices), the method 300 may include at least one of pairing, authenticating, and/or authorizing at least some of the one or more recipient devices and/or applications executing thereon for communicating with the coupling device 200. In this manner, the security of the PON 100 may be protected against malicious intrusion by rogue wireless devices and/or by rogue applications executing on recipient wireless devices.

In some embodiments (not shown in FIG. 3), the method 300 may include detecting, by the coupling device 200, one or more conditions associated with sub-components of the coupling device itself (e.g., sub-components 205, 210, 212, 215, 218, 220, 222, 225, 230, 232, 235, 238, 240 of the coupling device 200) and/or associated with the operations of the sub-components, and wirelessly transmitting, by the coupling device, indications of the detected conditions to one or more recipient devices 228 via the wireless interface(s) 255. For example, the coupling device 200 may detect a status, state, fault, level of performance, degradation of performance, and/or other condition of one or more sub-components of the coupling device, and the coupling device 200 may transmit an indication of the detected condition(s) to one or more wireless recipient devices 228 via suitable wireless interfaces 225. The direct recipient device 228 of the transmitted wireless signal in which the indication of the detected sub-component condition(s) is included may be the intended end recipient of the payload of the wireless signal, or the direct recipient device of the transmitted wireless signal may be an intermediate recipient which forwards the indication of the detected sub-component condition(s) to an intended end-recipient, e.g., as previously discussed.

In some embodiments (not shown in FIG. 3), the method 300 may include wirelessly transmitting (e.g., from the coupling device 200 via one or more wireless interfaces 225) information that has been received or obtained by the coupling device from the LMTU 202. For example, the LMTU 202 may provide information about its status, diagnostic results, conditions detected at the LMTU 202, and/or other types of information to the coupling device 200 (e.g., via the optical interface 218 and/or via the communication interface 222), and the coupling device 200 may forward or otherwise provide the information provided by the LMTU 202 to one or more intended recipient devices 228 via the wireless interface 255.

In some embodiments (not shown in FIG. 3), the method 300 may include transmitting, from the coupling device 200 to the PON 100, the indications of the detected sub-component condition(s) and/or the information that has been provided by the LMTU 202 and received by the coupling device 200 via the second optical interface 218 and/or the communication interface 222. In these embodiments, the coupling device 200 may transmit, via one or more selected optical wavelength bands over the network-side optical interface 205 and the optical fiber 208, the indications of the detected sub-component condition(s) and/or the information provided by the LMTU 202 and received by the coupling device 200 to one or more components of the PON 100, such as the FDH 116a, the OLT 102, the servers 130, etc. As such, in these embodiments, the method 300 may further include generating, by the coupling device 200, one or more optical signals having payload corresponding to the indication of the detected sub-component condition(s) and/or the information obtained by the coupling device from the LMTU 202, and transmitting the one or more optical signals from the coupling device 200 via the first optical interface 205 and optical fiber 208 to one or more recipient components of the PON 100.

In some embodiments (not shown in FIG. 3), the method 300 may include receiving, at the coupling device 200, one or more wireless signals via one or more of the wireless interfaces 255. For example, the coupling device 200 may receive, via the wireless interface 255, a wireless signal from a portable electronic device 228 that is operated by an agent of the PON 100 at the location serviced by the LMTU 202, or from another wireless device of the PON 100 which is networked to the servers 130 of the PON 100. The received wireless signal may include an instruction for the coupling device 200, such as a request for data and/or information pertaining to the coupling device 200, to the optical fiber 208, and/or to the LMTU 202; an instruction for the coupling device 200 and/or the LMTU 202 to perform a diagnostic, analytic, administrative, or other type of function; an instruction to change a setting or parameter value; etc. As such, in these embodiments, generating 308 the wireless signal may include generating a wireless signal having payload responsive to the received instruction, and transmitting 310 the wireless signal may include transmitting the generated wireless signal to the instructing device, e.g., via the wireless interface 225.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A coupling device utilized in a passive optical network (PON), the coupling device comprising: a first optical interface via which an optical fiber of the PON is received at the coupling device, the optical fiber optically connecting the coupling device to an optical line terminal (OLT) of the PON; a second optical interface that optically couples the coupling device to a last mile termination unit, the last mile termination unit and the coupling device both disposed at a location serviced by the PON; a pass-through component that optically connects the first optical interface and the second optical interface and via which the coupling device delivers at least one optical signal between the optical fiber and the last mile termination unit; and one or more wireless interfaces via which the coupling device transmits, to one or more other devices, one or more wireless signals corresponding to the at least one optical signal.

2. The coupling device of example 1, wherein the one or more wireless interfaces include a different wireless interface that supports each of one or more different types of wireless links, the one or more different types of wireless links including at least one of: a near-field communication (NFC) wireless link, a 2.4 GHz radio link, a 5.2 GHz radio link, a 900 MHz radio link, a Wi-Fi link, or a Bluetooth wireless link.

3. The coupling device of example 2, wherein the one or more wireless interfaces include a plurality of wireless interfaces, and the coupling device selects, from the plurality of wireless interfaces, a particular wireless interface via which the coupling device transmits a particular wireless signal, the selection based on a payload of the particular wireless signal.
4. The coupling device of example 1, wherein the one or more other devices include a portable computing device that is disposed at the location serviced by the PON and communicatively coupled to the coupling device via a wireless link.
5. The coupling device of example 4, wherein the coupling device at least one of authenticates or authorizes the portable computing device prior to transmitting, to the portable computing device, any wireless signals that include data that is indicative of one or more conditions of the at least one optical signal, the one or more conditions detected by the coupling device.
6. The coupling device of example 1, further comprising one or more processors operable to cause the coupling device to generate the one or more wireless signals corresponding to the at least one optical signal based on obtained information.
7. The coupling device of example 6, wherein the coupling device includes one or more sensors, the obtained information includes data generated by the one or more sensors, and a payload of the one or more wireless signals is based on the data generated by the one or more sensors.
8. The coupling device of example 7, wherein the data generated by the one or more sensors includes one or more measurements of the at least one optical signal delivered between the optical fiber and the last mile termination unit via the coupling device.
9. The coupling device of example 6, wherein: the obtained information includes an instruction generated by one of the one or more other devices; and at least one of the one or more wireless signals is responsive to the instruction.
10. The coupling device of example 6, wherein the one or more processors are further operable to cause the coupling device to generate one or more additional optical signals based on the obtained information and to cause the one or more additional optical signals to be transmitted, from the coupling device, via the first optical interface and optical fiber.
11. The coupling device of example 10, the obtained information includes data generated by one or more sensors of the coupling device, and a payload of the one or more additional optical signals is based on the data generated by the one or more sensors.
12. The coupling device of example 1, wherein the coupling device and at least one of the one or more other devices are nodes of a wireless mesh network.
13. The coupling device of example 1, wherein the one or more other devices include at least one other component of the PON.
14. The coupling device of example 1, wherein:
the at least one optical signal that is delivered, via the pass-through component, between the optical fiber and the last mile termination unit is a first set of optical signals of a first set of wavelengths; the coupling device detects a presence of a second set of optical signals, of a second set of wavelengths, received at the coupling device via the optical fiber and the first optical interface; and the coupling device converts the second set of optical signals into the first set of wavelengths and transmits the converted, second set of optical signals to the last mile termination unit via the second optical interface.
15. The coupling device of example 14, wherein the first set of wavelengths includes at least one of wavelengths between 1260-1543 nanometers or wavelengths between 1573-1650 nanometers.
16. The coupling device of example 14, wherein the second set of wavelengths includes wavelengths between 1553-1565 nanometers.
17. A method at a coupling device of a passive optical network (PON), the method comprising: obtaining, by the coupling device and via a first optical interface of the coupling device, at least one optical signal that has been delivered over an optical fiber of the PON, the optical fiber received at the coupling device at the first optical interface and the optical fiber optically connecting the coupling device to an optical line terminal (OLT) of the PON; providing, by the coupling device and via a second optical interface of the coupling device, the at least one optical signal to a last mile termination unit, the second optical interface optically coupling the coupling device to the last mile termination unit, and the last mile termination unit and the coupling device both disposed at a location serviced by the PON; generating, by the coupling device, a wireless signal corresponding to the at least one optical signal; and transmitting, by the coupling device, the wireless signal to a second device via a wireless interface of the coupling device.
18. The method of example 17, wherein: the coupling device includes a plurality of different types of wireless interfaces; the plurality of different types of wireless interface includes the wireless interface; and the method further comprises selecting, by the coupling device, the wireless interface from the plurality of different types of wireless interfaces based on a payload of the wireless signal.
19. The method of example 18, wherein the plurality of different types of wireless interfaces supports at least two of: 2.4 GHz radio frequency (RF) communications, 5.2 GHz RF communications, 900 MHz RF communications, Wi-Fi, Bluetooth, or near-field communication (NFC).
20. The method of example 17, wherein the transmitting of the wireless signal to the second device includes transmitting the wireless signal to a portable computing device that is disposed at the location serviced by the PON and communicatively coupled to the coupling device via a wireless link supported by the wireless interface.
21. The method of example 20, further comprising at least one of authenticating or authorizing, by the coupling device, the portable computing device prior to transmitting, to the portable computing device, any wireless signals that include payload indicative of data that is indicative of one or more conditions of the at least one optical signal, the one or more conditions detected by the coupling device.
22. The method of example 20, further comprising obtaining, by the coupling device, information including at least one of data generated by one or more sensors of the coupling device or an instruction that has been generated by the portable computing device; and the generating of the wireless signal includes generating a wireless signal having payload corresponding to the information obtained by the coupling device.

23. The method of example 22, wherein the data generated by the one or more sensors includes one or more measurements corresponding to the at least one optical signal.

24. The method of example 22, further comprising generating one or more additional optical signals having payload corresponding to the information obtained by the coupling device, and transmitting the one or more additional optical signals from the coupling device via the first optical interface and optical fiber.

25. The method of example 17, wherein the coupling device is a node of a wireless network, and transmitting the wireless signal to the second device includes transmitting the wireless signal to another node of the wireless network.

26. The method of example 17, wherein the transmitting of the wireless signal to the second device includes transmitting the wireless signal to another component of the PON.

27. The method of example 17, wherein the at least one optical signal is a first set of optical signals of a first set of wavelengths, and the method further comprises: detecting, by the coupling device, a presence of a second set of optical signals that is received by the coupling device via the optical fiber and the first optical interface, the second set of optical signals being of a second set of wavelengths; converting, by the coupling device, the second set of optical signals to be of the first set of wavelengths; and providing, by the coupling device, the converted, second set of optical signals to the last mile termination unit via the second optical interface.

28. The method of example 27, wherein at least one of:
(i) the first set of wavelengths includes at least one of wavelengths between 1260-1543 nanometers or wavelengths between 1573-1650 nanometers; or
(ii) the second set of wavelengths includes wavelengths between 1553-1565 nanometers.

29. The method of example 27, further comprising automatically tuning, by the coupling device, to the second set of wavelengths.

30. The method of example 17, further comprising performing, by the coupling device, one or more analytics routines based on one or more conditions of the at least one optical signal, the one or more conditions sensed by a sensor of the coupling device; and wherein the generating of the wireless signal includes generating a wireless signal having payload indicative of an output of the one or more analytics routines.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method at a coupling device of a passive optical network (PON), the method comprising:
upon communicatively connecting with a last mile termination unit (LMTU) of the PON, the LMTU and the coupling device both disposed at a location serviced by the PON, obtaining, by the coupling device and from the LMTU, a first indication of an identification of the LMTU;
tuning a first optical interface of the coupling device based on an identity of an optical wavelength band corresponding to the identification of the LMTU;
obtaining, by the coupling device and via the first optical interface of the coupling device, at least one optical signal that has been delivered over an optical fiber of the PON, the optical fiber received at the coupling device at the first optical interface and the optical fiber optically connecting the coupling device to an optical line terminal (OLT) of the PON; and
providing, by the coupling device and via a second optical interface of the coupling device, the at least one optical signal to the LMTU, the second optical interface optically coupling the coupling device to the last mile termination unit.

2. The method of claim 1, wherein the identification of the LMTU uniquely identifies the LMTU within the PON or within a plurality of PONs in which the PON is included.

3. The method of claim 1, wherein the identification of the LMTU is based on at least one of: a serial number of the LMTU, a MAC address of the LMTU, an identifier or other suitable indication of the PON 100 with respect to a Full Service Access Network (FSAN) or other association of operator companies of PONs, or geospatial coordinates of the LMTU.

4. The method of claim 1, wherein the obtaining of the first indication of the identification of the LMTU includes passively obtaining the first indication of the identification of the LMTU by reading a tag, obtaining broadcasted information, or utilizing another passive technique to obtain the first indication.

5. The method of claim 1, wherein the obtaining of the first indication of the identification of the LMTU includes actively obtaining the first indication of the identification of the LMTU by querying the LMTU or by utilizing another active technique to obtain the first indication.

6. The method of claim 1, wherein obtaining the first indication of the identification of the LMTU includes obtaining the first indication of the LMTU via a local-facing interface directly connecting the coupling device and the LMTU.

7. The method of claim 6, wherein the local-facing interface is the second optical interface, a wireless interface, or a wired interface.

8. The method of claim 1, wherein the identification of the LMTU is a self-identification of the LMTU.

9. The method of claim 1, wherein the first indication of the identification of the LMTU is of a near field communications (NFC), radio frequency identification (RFID), or other type of encoded format.

10. The method of claim 1, wherein:
the first optical interface supports a plurality of optical wavelength bands; and
the method further comprises determining a respective identity of at least one optical wavelength band of the plurality of optical wavelength bands based on the identification of the LMTU.

11. The method of claim 1, further comprising:
selecting, by the coupling device, an output interface from among a plurality of output interfaces of the coupling device, the plurality of output interfaces including the first optical interface; and
transmitting, by the coupling device and via the selected output interface, the first indication or a second indication of the identification of the LMTU to another device.

12. The method of claim 11, wherein the transmitting, from the coupling device, of the first indication or the second indication of the identification of the LMTU includes transmitting the first indication or the second indication of the identification of the LMTU from the coupling device via the first optical interface of the coupling device.

13. The method of claim 11, wherein the transmitting, from the coupling device, of the first indication or the second indication of the identification of the LMTU includes transmitting the first indication or the second indication of the identification of the LMTU from the coupling device via a wireless interface of the coupling device.

14. The method of claim 11, wherein the transmitting, from the coupling device, of the first indication or the second indication of the identification of the LMTU includes transmitting the first indication or the second indication of the identification of the LMTU to a portable computing device.

15. The method of claim 11, further comprising:
obtaining, by the coupling device, a status, a state, or other information from the LMTU; and
transmitting, from the coupling device, an indication of the obtained status, state, or other information in conjunction with the transmitting of the first indication or the second indication of the identification of the LMTU.

16. A coupling device of a passive optical network (PON), the coupling device comprising:
a first optical interface at which an optical fiber of the PON is received and via which a set of optical signals that has been delivered over the optical fiber is obtained by the coupling device, the optical fiber optically connecting the coupling device to an optical line terminal (OLT) of the PON;
a second optical interface that optically couples the coupling device to a last mile termination unit (LMTU), the last mile termination unit disposed at a location serviced by the PON;
a pass-through component optically connecting the first optical interface and the second optical interface and via which the coupling device delivers the first set of optical signals between the optical fiber and the last mile termination unit; and
computer-executable instructions that are stored on one or more memories of the coupling device and that, when executed by one or more processors of the coupling device, cause the coupling device to, upon communicatively connecting with the LMTU:
obtain, from the LMTU, a first indication of an identification of the LMTU; and
tune the first optical interface to an optical wavelength band corresponding to the identification of the LMTU.

17. The coupling device of claim 16, wherein the identification of the LMTU uniquely identifies the LMTU within the PON or within a plurality of PONs in which the PON is included.

18. The coupling device of claim 16, wherein the identification of the LMTU is based on at least one of: a serial number of the LMTU, a MAC address of the LMTU, an identifier or other suitable indication of the PON 100 with respect to a Full Service Access Network (FSAN) or other association of operator companies of PONs, or geospatial coordinates of the LMTU.

19. The coupling device of claim 16, wherein the first indication of the identification of the LMTU is passively obtained by the coupling device from the LMTU by reading a tag, obtaining broadcasted information, or utilizing another passive technique.

20. The coupling device of claim 16, wherein the first indication of the identification of the LMTU is actively obtained by the coupling device from the LMTU by querying the LMTU or by utilizing another active technique.

21. The coupling device of claim 16, wherein the first indication of the identification of the LMTU is obtained by the coupling device via a local-facing interface directly connecting the coupling device and the LMTU.

22. The coupling device of claim 21, wherein the local-facing interface is the second optical interface, a wireless interface, or a wired interface.

23. The coupling device of claim 16, wherein the identification of the LMTU is a self-identification of the LMTU.

24. The coupling device of claim 16, wherein the first indication of the identification of the LMTU is of a near field communications (NFC), radio frequency identification (RFID), or other type of encoded format.

25. The coupling device of claim 16, wherein:
the first optical interface supports a plurality of optical wavelength bands; and
the computer-executable instructions are further executable to cause the coupling device to determine a respective identity of at least one optical wavelength band of the plurality of optical wavelength bands based on the identification of the LMTU.

26. The coupling device of claim 16, wherein the computer-executable instructions are further executable to cause the coupling device to:
select an output interface from among a plurality of output interfaces of the coupling device, the plurality of output interfaces including the first optical interface; and
transmit, via the selected output interface, the first indication or a second indication of the identification of the LMTU to another device.

27. The coupling device of claim 26, wherein the transmission of the first indication or the second indication of the identification of the LMTU is via the first optical interface of the coupling device.

28. The coupling device of claim 26, wherein the transmission of the first indication or the second indication of the identification of the LMTU is via a wireless interface of the coupling device.

29. The coupling device of claim 26, wherein the another device is a portable computing device.

30. The coupling device of claim 26, wherein the coupling device further obtains a status, a state, or other information from the LMTU and transmits an indication of the obtained status, state, or other information in conjunction with the transmission of the first indication or the second indication of the identification of the LMTU.

* * * * *